United States Patent Office 3,121,676
Patented Feb. 18, 1964

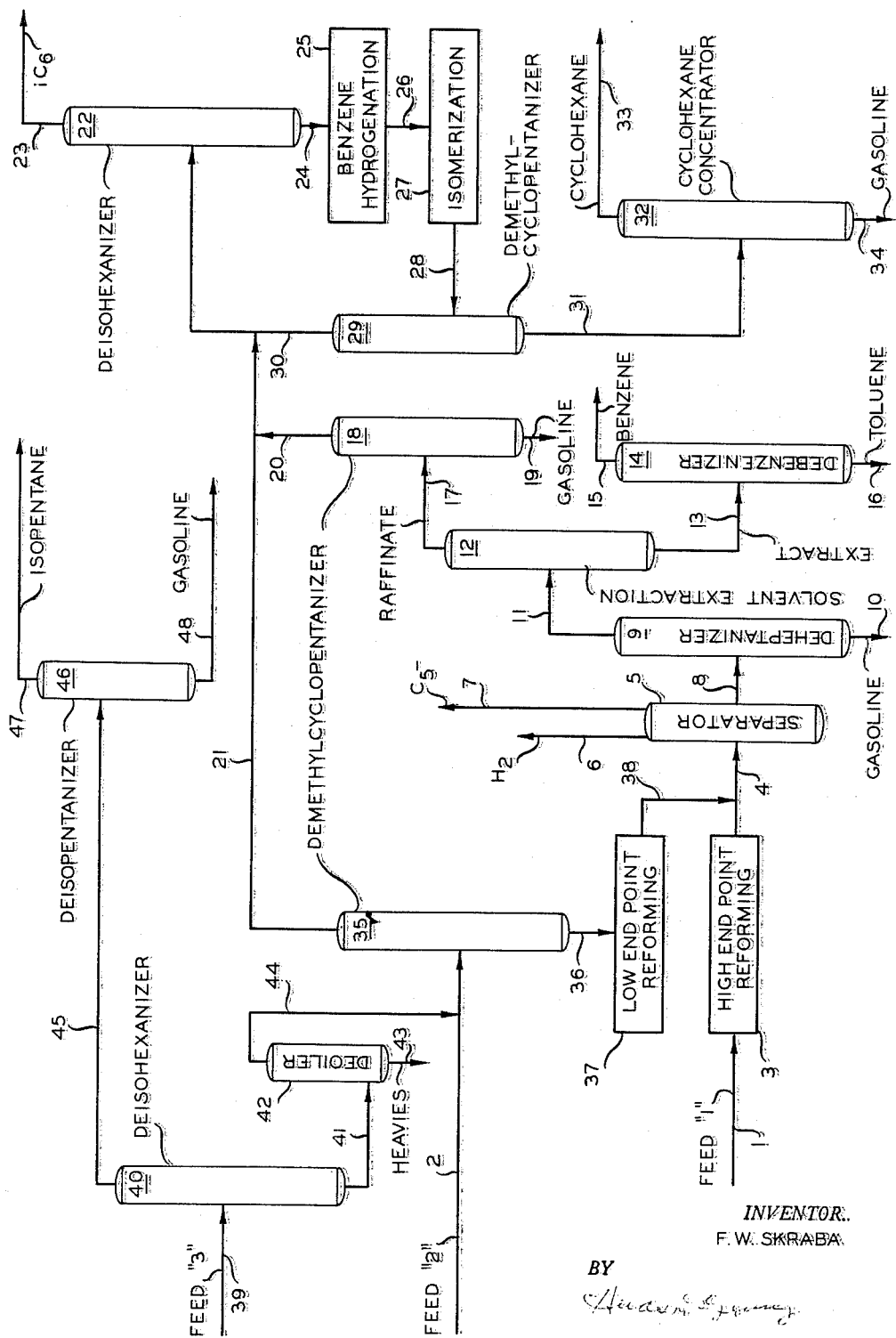

3,121,676
UP-GRADING HYDROCARBONS
Frank W. Skraba, Sweeny, Tex., assignor to Phillips
Petroleum Company, a corporation of Delaware
Filed Aug. 17, 1961, Ser. No. 132,104
3 Claims. (Cl. 208—62)

This invention relates to a process and apparatus for up-grading hydrocarbon mixtures. In one of its aspects, it relates to a novel combination of steps comprising reforming, fractionation, solvent extraction, hydrogenation, and isomerization. In another aspect, the invention relates to a process and apparatus for up-grading hydrocarbons which comprises reforming a first feed stream in a first low end-point reforming zone to produce a first reformate stream, solvent extracting said first reformate stream to produce an extract stream comprising benzene and toluene and a raffinate stream comprising paraffins and naphthenes, separating said extract stream into a high-purity benzene product stream and a high-purity toluene product stream, separating said raffinate stream into a paraffin-containing product stream and a first napthene-containing stream, hydrogenating and isomerizing said first naphthene-containing stream, separating from the thus hydrogenated and isomerized stream a high-purity cyclohexane product, reforming a second feed stream in a high end-point reforming zone to produce a second reformate stream, and admixing said second reformate stream with said first reformate stream. In still another aspect, the invention relates to process and apparatus for producing benzene, toluene, and cyclohexane from commonly available refinery streams.

Because of the rapid and relatively recent of the pertrochemical industry, demand for certain bulk chemicals of relatively high-purity has increased to the point where it is more economically attractive to produce these chemicals than others which were in former demand. Among these chemicals of present demand are benzene, toluene, and cyclohexane. As known to the art, these chemicals are valuable for example as solvents, reaction media, and polymer starting materials. There is a substantial need in the art for processes and apparatus suitable for producing increasing quantities of these named chemicals from commonly available refinery streams.

Accordingly, it is an object of this invention to provide process and apparatus for producing quantities of benzene, toluene, and cyclohexane. It is another object of this invention to provide a novel combination of steps whereby commonly available refinery streams can be processed to produce increased quantities of relatively high-purity benzene, toluene, and cyclohexane.

Other aspects, objects, and the several advantages of the invention will become apparent to one skilled in the art upon study of this disclosure, drawing, and appended claims.

According to my invention there is provided a process and apparatus for up-grading hydrocarbons which comprises reforming a first feed stream in a first low end-point reforming zone to produce a first reformate stream, solvent extracting said first reformate stream to produce an extract stream comprising benzene and toluene and a raffinate stream comprising paraffins and naphthenes, separating said extract stream into a high-purity benzene product stream and a high-purity toluene product stream, separating said raffinate stream into a paraffin-containing product stream and a first naphthene-containing stream, hydrogenating and isomerizing said first naphthene-containing stream, separating from the thus hydrogenated and isomerized stream a high-purity cyclohexane product, reforming a second feed stream in a high end-point reforming zone to produce a second reformate stream, and admixing said second reformate stream with said first reformate stream.

For a more complete understanding of my invention, reference is now made to the accompanying drawing which represents in schematic detail a presently-preferred form of my invention.

Referring to the drawing, a feed "1" which can be a high end-point naphtha is passed by way of conduit 1 to a high end-point reforming zone 3. Zone 3 is operated, as known in the art, to convert paraffins and napthenes present in the feed to aromatics, and can comprise Platforming, Ultraforming, Houdriforming, or other known reforming operations. The reformate is passed by way of conduit 4, wherein it is mixed with a second reformate as will be discussed later, to a separation zone 5. In this zone 5, excess hydrogen resulting from the reforming is removed by way of conduit 6 and the lighter fractions of the reformate, for example $C_5$ and lighter hydrocarbons, are removed by way of conduit 7. The resulting stream, comprising a mixture of $C_6$ and heavier paraffins, naphthenes, and aromatics with small amounts of olefin, is passed by way of conduit 8 to a deheptanizing fractionator 9, wherein a stream comprising the $C_8$ and heavier hydrocarbons is removed by way of conduit 10, and can be utilized as a gasoline product or, for example, as a blending stock. The remaining stream comprises $C_6$ and $C_7$ paraffins, naphthenes, and aromatics and is passed by way of conduit 11 to a solvent extraction zone 12. This zone can comprise one of the many processes for selective separation of hydrocarbon types, such as extraction with liquid $SO_2$. The aromatic extract stream thus produced is passed by way of conduit 13 to a fractionator 14, and is there separated into a high-purity benzene product stream removed by way of conduit 15 and a high-purity toluene product stream removed by way of conduit 16. The raffinate stream from zone 12 is passed by way of conduit 17 to a fractionator 18. This stream comprises $C_6$ and $C_7$ paraffins and naphthenes, and is separated in fractionator 18 to produce a methylcyclopentane-and-lighter stream removed by way of conduit 20 and a residual product suitable, for example, as a gasoline blending stock, removed by way of conduit 19. The overhead in conduit 20 is mixed with other later-described streams from conduits 21 and 30, and then passed to a fractionator 22. Here a relatively pure insohexane product is removed overhead by way of conduit 23, and the residue of this stream is passed by way of conduit 24 to a hydrogenation zone 25. Excess hydrogen, for example from conduit 6, is utilized here to effect saturation of any residual unsaturation in the stream, and results primarily in formation of cyclohexane from benzene. The resulting stream is passed by way of conduit 26 to isomerization zone 27, wherein generally normal paraffins are isomerized to isoparaffins, and alkyl napthenes are isomerized to unsubstituted naphthenes. The isomerized stream is passed by way of conduit 28 to a fractionator 29, wherein methylcyclopentane and lighter is passed by way of conduit 30 to conduit 21, previously described. The bottoms from this fractionation is passed by way of conduit 31 to a fractionator 32, wherein a high-purity cyclohexane product is separated and passed to further utility by way of conduit 33. A gasoline blending stock is recovered by way of conduit 34.

A second feed material, which can comprise for example a 300° F. end point straight run gasoline and/or an impure (e.g., 85%) cyclohexane stream is introduced to the process by way of conduit 2, and is admixed with a stream from conduit 44. This latter stream is obtained from a natural gas liquid stream which comprises a third feed stream passed to the process by way of conduit 39.

This third feed stream is separated in fractionator 40 into an isohexane and lighter stream removed by way of conduit 45 and a residual stream removed by way of conduit 41. Stream 45 can be further separated, if desired, in fractionator 46 into a stream comprising isopentane removed by way of conduit 47 and a gasoline blending stock removed by way of conduit 48. Residual stream 41 is deoiled in fractionator 42, with the heavy ends being removed by way of conduit 43 and the center cut of the feed being passed by way of conduit 44 to conduit 2, wherein it is admixed, as previously stated, with the second feed. The admixed stream is passed to a fractionator 35, wherein methylcyclopentane and lighter are removed overhead and passed by way of conduit 21 to fractionator 22 as previously described. The bottoms from fractionator 35 are passed by way of conduit 36 to a low end-point reforming zone 37, which can be a reforming process similar to that described in conjunction with high end-point reforming zone 3. The reformate from zone 37 is passed by way of conduit 38 to conduit 4 wherein it is admixed with reformate from zone 3 and further processed as previously described.

Thus, it can be seen that the plural reforming operations processing, as it were, special cuts of common refinery feeds combine to produce a stream rich in paraffins, aromatics, and naphthenes which in turn is separated by solvent extraction to yield an extract of the desired high-purity aromatics and a raffinate which is hydrogenated and isomerized to yield, after separation, a desired high-purity naphthene.

*Example*

The low end point reforming (Platforming) operation is operated in the temperature range of 700 to 1000° F., preferably at about 800 to 950° F., and in a pressure range of 0 to 1000 p.s.i.g., preferably 200 to 600 p.s.i.g. The hydrogen used is usually 0.5 to 20 mols per mol of feed, preferably 1 to 6. The catalyst is preferably a platinum-type reforming catalyst, that is, alumina impregnated with between 0.1 and 5 weight percent platinum, preferably 0.1 to 1 weight percent, and containing fluorine.

The high end point reforming (Platforming) operation is operated in the temperature range of 700 to 1000° F., preferably at about 800 to 950° F., and in a pressure range of 0 to 1000 p.s.i.g., preferably 300 to 700 p.s.i.g. The hydrogen used is usually 1 to 20 mols per mol of feed, preferably 2 to 10. The catalyst is the same as described with respect to the low end point reforming operation.

Benzene hydrogenation is effected at temperatures ranging from 370 to 500° F., and at pressures ranging from 400 to 500 p.s.i.g., and hydrogen to aromatics mol ratios in the range of 5:1 to 12:1. The catalyst used is a nickel hydrogenation catalyst, e.g., nickel on kieselguhr, the nickel content ranging from 20 to 55 weight percent nickel.

The isomerization process is effected in a temperature range of 80 to 170° F., and preferably 100 to 150° F. The pressures used are 160 to 200 p.s.i.g., preferably 170 to 190 p.s.i.g. The catalyst used is aluminum chloride complex promoted by hydrochloric acid.

The solvent extraction and fractionation steps are operated as known in the art to make the disclosed separations.

Conduit 1 (to high end point reformer):
- Barrels per day _____ 11,000
- API at 60° F./60° F _____ 54.6
- Composition, vol. percent—
  - Paraffinics _____ 58.0
  - Naphthenics _____ 40.0
  - Aromatics _____ 12.0

Conduit 36 (to low end point reformer):
- Barrels per day _____ 13,000
- API at 60° F./60° F _____ 59.0
- Composition, vol. percent—
  - Paraffinics _____ 43.0
  - Naphthenics _____ 50.0
  - Aromatics _____ 7.0

Conduit 24 (charge to hydrogenation):
- Barrels per day _____ 6,115
- Composition, vol. percent—
  - Methylcyclopentane _____ 35.2
  - Hexanes _____ 59.1
  - Benzene _____ 5.7

Conduit 26 (charge to isomerization):
- Barrels per day _____ 6,190
- Composition, vol. percent—
  - Methylcyclopentane _____ 34.7
  - Hexanes _____ 58.4
  - Cyclohexane _____ 6.9

Product yields:

| | B./D. | Purity, L.V., percent |
|---|---|---|
| Conduit 33, Cyclohexane | 1,925 | 98.0 |
| Conduit 15, Benzene | 1,400 | 99.9 |
| Conduit 16, Toluene | 2,600 | 95.0 |

Reasonable variation and modification are possible within the scope of this disclosure, the appended claims, and the drawing of the invention, the essence of which is that there is provided process and apparatus for up-grading mixed hydrocarbons comprising a plurality of reforming steps, solvent extraction of the mixed reformate, separation of the resulting extract phase to produce high-purity aromatics, and hydrogenation, isomerization, and fractionation of the raffinate phase to produce high-purity naphthenes, along with advantageous recycles of various streams.

I claim:

1. A process for up-grading a plurality of hydrocarbon mixtures into a high purity cyclohexane, valuable aromatics and gasoline components which comprises the steps of:
   (a) in a first reforming zone (3), reforming a feed (1) comprising a high end point naphtha reforming feed containing paraffins, naphthenes and aromatics;
   (b) separating (35) another feed (2) comprising at least one of an impure cyclohexane containing stream and a low end boiling point straight-run gasoline, having an approximate end boiling point of about 300° F., into a methylcyclopentane-and-lighter stream (21) and a residue stream containing paraffins, naphthenes and aromatics (36);
   (c) reforming (37) the residue stream obtained in step "b";
   (d) admixing the reformates of steps "a" and "c" (4);
   (e) separating 5, 9) the admixed reformates of step "d" into a hydrogen containing product stream (6), a $C_5$-and-lighter product stream (7), a $C_7$-and-heavier gasoline product (10) and a $C_6$-containing stream (11);
   (f) separating by solvent extraction (12) the $C_6$-containing stream of step "e" into a benzene and toluene containing extract product stream (13) and a paraffin- and naphthene-containing raffinate stream (17);
   (g) separating (18) the raffinate stream of step "f" into a methylcyclopentane-and-lighter containing stream (20) and a gasoline product stream (19);
   (h) admixing the methylcyclopentane-and-lighter containing streams (21 and 20) obtained in steps "b" and "g" and with a further stream obtained as described later herein;
   (i) separating (22) the admixed streams of step "h" into an iso-hexane containing product stream (23) and a napththenes and paraffins containing stream also containing benzene (24);
   (j) hydrogenating (25) the benzene contained in the last-mentioned stream of step "i" and isomerizing methylcyclopentane in said naphthenes contained in the last-mentioned stream of step "i" (27);

(k) separating (29) the effluent (28) of step "j" into a methylcyclopentane-and-lighter containing stream (30) and a cyclohexane containing stream (31), the said methylcyclopentane-and-lighter stream (30) being the stream admixed with other streams in step "h," and recovering said cyclohexane.

2. The process according to claim 1 wherein a high purity cyclohexane is recovered from the cyclohexane containing stream (31) of step "k" by separating (32) the same into a high purity cyclohexane (33) and a gasoline fraction (34).

3. A process according to claim 1 wherein a feed comprising a de-isohexanized, de-oiled natural gas liquids stream is admixed with the feed to step "b."

References Cited in the file of this patent

UNITED STATES PATENTS

| | | |
|---|---|---|
| 2,913,393 | Sarno | Nov. 17, 1959 |
| 3,009,002 | Kron | Nov. 14, 1961 |
| 3,013,088 | Merryfield | Dec. 12, 1961 |